United States Patent
Nomura et al.

(10) Patent No.: US 11,630,613 B2
(45) Date of Patent: Apr. 18, 2023

(54) PRINTING APPARATUS AND PRINTING SYSTEM FOR DETECTING PRINT QUALITY BASED UPON A DETECTED VARIATION

(71) Applicant: SCREEN HOLDINGS CO., LTD., Kyoto (JP)

(72) Inventors: Seiya Nomura, Kyoto (JP); Atsushi Imamura, Kyoto (JP); Tomotaka Kato, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/385,534

(22) Filed: Jul. 26, 2021

(65) Prior Publication Data

US 2022/0091796 A1     Mar. 24, 2022

(30) Foreign Application Priority Data

Sep. 23, 2020    (JP) .............................. JP2020-159018

(51) Int. Cl.
*G06F 3/12*           (2006.01)

(52) U.S. Cl.
CPC .......... *G06F 3/1208* (2013.01); *G06F 3/1264* (2013.01); *G06F 3/1284* (2013.01)

(58) Field of Classification Search
CPC .............................. G06F 3/1234; G06F 3/1259
See application file for complete search history.

(56) References Cited

U.S. PATENT DOCUMENTS

| | | | |
|---|---|---|---|
| 2014/0341437 A1* | 11/2014 | Araki | G06T 7/0008 382/112 |
| 2015/0269719 A1* | 9/2015 | Kitai | G06T 7/001 358/474 |
| 2016/0034230 A1* | 2/2016 | Hori | G06K 15/16 358/1.12 |
| 2017/0355204 A1* | 12/2017 | Imamura | B41J 15/16 |
| 2019/0086845 A1* | 3/2019 | Hashiguchi | G03G 15/2039 |
| 2020/0096925 A1* | 3/2020 | Ikuta | G06F 3/1259 |
| 2021/0053342 A1* | 2/2021 | Yoshinuma | B41J 11/0022 |

FOREIGN PATENT DOCUMENTS

JP       2016-055570 A     4/2016

* cited by examiner

*Primary Examiner* — Benjamin O Dulaney
(74) *Attorney, Agent, or Firm* — McDermott Will & Emery LLP

(57) ABSTRACT

A printing apparatus includes a head part, an encoder, a tension sensor, a head part temperature sensor, an edge sensor, an estimation part, a storage, and an output part. The estimation part estimates print quality in terms of a page printed by the head part on the basis of variation elements detected by the encoder, the tension sensor, the head part temperature sensor, and the edge sensor. The storage stores print quality information containing the printed page and the print quality estimated by the estimation part in association with each other. The output part outputs the print quality information to a display, a post-processing device, and a printer controller section.

12 Claims, 9 Drawing Sheets

FIG. 5

| VARIATION ELEMENT | QUALITY RANK B | QUALITY RANK C | |
|---|---|---|---|
| VARIATION IN MEANDERING AMOUNT | 50 | 70 | EQUAL TO OR GREATER THAN ⋯ μm |
| VARIATION IN TENSION | 2.0 | 5.0 | EQUAL TO OR GREATER THAN ⋯ kgm |
| VARIATION IN TEMPERATURE AT DRYING PART | 8 | 15 | EQUAL TO OR GREATER THAN ⋯ °C |
| VARIATION IN TEMPERATURE AT HEAD PART | 10 | 20 | EQUAL TO OR GREATER THAN ⋯ °C |
| VARIATION IN TRANSPORT SPEED | 30 | — | EQUAL TO OR LESS THAN ⋯ mpm |
| PRINTING DURING ACCELERATION/DECELERATION | B | | |

PRINT CONDITION : COATED PAPER AVAILABLE FROM XXX CORPORATION

| PRINTED PAGE No. | IMAGE INSPECTION A:NORMAL/ C:ABNORMAL | PRINTER STATE | | | | | | COMPREHENSIVE JUDGMENT |
|---|---|---|---|---|---|---|---|---|
| | | VARIATION IN MEANDERING AMOUNT | VARIATION IN TENSION | VARIATION IN TEMPERATURE AT DRYING PART | VARIATION IN TEMPERATURE AT HEAD | TRANSPORT SPEED | DURING ACCELERATION /DECELERATION | |
| 1 | A | C | B | A | A | B | B | C |
| 2 | A | C | B | A | A | B | B | C |
| 3 | A | B | B | A | A | B | B | B |
| 4 | A | B | A | A | A | A | B | B |
| 5 | A | A | A | A | A | A | B | B |
| 6 | A | A | A | A | A | A | A | A |
| 7 | A | A | A | A | A | A | A | A |
| 8 | A | A | A | A | A | A | A | A |
| 9 | A | A | A | A | A | A | A | A |
| 10 | A | A | A | A | A | A | A | A |
| 11 | A | A | A | A | A | A | A | A |
| 12 | A | A | A | A | A | A | A | A |
| 13 | C (BREAK DETECTED) | A | A | A | A | A | A | C |
| 14 | A | A | A | A | A | A | A | A |
| 15 | A | A | A | A | A | A | A | A |
| 16 | A | A | A | A | A | A | A | A |
| 17 | A | A | A | A | A | A | A | A |
| 18 | A | A | A | A | A | A | A | A |
| 19 | A | A | A | A | A | A | A | A |
| 20 | A | A | A | A | A | A | A | A |
| 21 | C (DIRT DETECTED) | A | A | A | A | A | A | C |
| 22 | A | A | A | A | A | A | A | A |
| 23 | A | A | A | A | A | A | A | A |
| 24 | A | A | A | A | A | A | A | A |
| ... | ... | ... | ... | ... | ... | ... | ... | ... |

PRINTING APPARATUS AND PRINTING SYSTEM FOR DETECTING PRINT QUALITY BASED UPON A DETECTED VARIATION

RELATED APPLICATIONS

This application claims the benefit of Japanese Application No. 2020-159018, filed on Sep. 23, 2020, the disclosure of which is incorporated by reference herein.

BACKGROUND OF THE INVENTION

Field of the Invention

The present invention relates to a printing apparatus and a printing system.

Description of the Background Art

A printing apparatus conventionally known forms an image on an elongated strip-shaped base material by ejecting ink from a nozzle on the base material transported in a predetermined direction. Japanese Patent Application Laid-Open No. 2016-055570 discloses a printing apparatus that suppresses misregister or color shift occurring when continuous paper meanders during printing. More specifically, Japanese Patent Application Laid-Open No. 2016-055570 states that, on the basis of actually measured waveform data about the amount of meandering of continuous paper, predicted waveform data about a meandering amount assumed to occur in subsequent continuous paper is generated, and that a print position for an image is compensated for in response to a shift amount based on the predicted waveform data.

SUMMARY OF THE INVENTION

Technical Problem

According to Japanese Patent Application Laid-Open No. 2016-055570, however, if abnormality of meandering of continuous paper occurs during printing, no record or no control is taken as to the point that a resultant printed object is printed during the occurrence of the abnormality. Hence, even on if a defect is caused by printing during meandering motion, it has been difficult to perform a follow-up process such as exclusion or reprinting of the resultant printed object.

Trend toward higher quality and higher accuracy of a printing apparatus has grown in recent years. For this reason, influence by a tiny defect in a printed image caused by abnormality at the printing apparatus becomes non-negligible. However, trying to detect a tiny defect in a printed image through image inspection requires higher specifications of an inspection device in terms of resolution or colorimetric performance. This requires an expensive scanner or a spectrophotometric colorimeter, a large-capacity memory, and wideband communication means, thereby causing a problem of increased size or higher cost of the apparatus. Hence, even if a tiny defect is caused in a printed image by the occurrence of abnormality during printing, performing a follow-up process on this printed object has been difficult.

Solution to Problem

The present invention is intended to provide a technique of performing a follow-up process on a printed object easily even on the occurrence of abnormality during printing.

A first aspect of the present invention is directed to a printing apparatus including: a transport part that transports an elongated strip-shaped base material in a transport direction; a head part that makes a print in terms of a predetermined print unit by ejecting ink to the base material transported by the transport part; a first detector that detects at least one of variation in a temperature at the head part, variation in the transport speed of the base material, variation in tension applied to the base material, and variation in the position of the base material as viewed in a width direction perpendicular to the transport direction; an estimation part that estimates print quality in terms of the print unit printed by the head part on the basis of a variation element detected by the first detector; a storage that stores print quality information containing the print unit and the print quality estimated by the estimation part in association with each other; and an output part that outputs the print quality information.

In the printing apparatus according to the first aspect, print quality in terms of a print unit based on a variation element is stored as the print quality information and is output. By doing so, even in the presence of abnormality occurring during printing, a printed object reduced in print quality by the abnormality can be subjected to a follow-up process easily.

According to a second aspect of the present invention, the printing apparatus according to the first aspect further includes an inspection processing part that inspects an image printed by the head part in terms of the print unit. The print quality information contains information about print quality based on result of inspection by the inspection processing part.

The printing apparatus according to the second aspect allows storage and output of information about print quality based on inspection result about a printed image together with information about print quality based on a variation element.

A third aspect of the present invention is directed to a printing system including: the printing apparatus according to the first aspect; and a printer controller section that supplies the printing apparatus with print data. The printer controller section includes: a receiving part that receives the print quality information output from the output part; and a reprinting instruction part that instructs the printing apparatus to reprint a print unit of poor print quality on the basis of the print quality information received by the receiving part.

In the printing system according to the third aspect, print quality in terms of a print unit based on a variation element is stored as the print quality information and is output. By doing so, even in the presence of abnormality occurring during printing, a printed object given poor print quality by the abnormality can be subjected to reprinting easily.

A fourth aspect of the present invention is directed to a printing system including: the printing apparatus according to the first aspect; and a post-processing device that processes a printed object printed by the printing apparatus. The post-processing device includes: a receiving part that receives the print quality information output from the output part; and a post-processing part that performs a predetermined process on a print unit of poor print quality on the basis of the print quality information received by the receiving part.

In the printing system according to the fourth aspect, print quality in terms of a print unit based on a variation element is stored as the print quality information and is output. By doing so, even in the presence of abnormality occurring during printing, a printed object given poor print quality by the abnormality can be subjected to a predetermined process easily.

A fifth aspect of the present invention is directed to a printing apparatus including: a transport part that transports an elongated strip-shaped base material in a transport direction; a head part that makes a print in terms of a predetermined print unit by ejecting ink to the base material transported by the transport part; a drying part that dries ink adhering to the base material at a position downstream from the head part in the transport direction; a second detector that detects variation in a temperature at the drying part; an estimation part that estimates print quality in terms of the print unit printed by the head part on the basis of a variation element detected by the second detector; a storage that stores print quality information containing the print unit and the print quality estimated by the estimation part in association with each other; and an output part that outputs the print quality information.

In the printing apparatus according to the fifth aspect, print quality in terms of a print unit based on variation in a temperature at the drying part is stored as the print quality information and is output. By doing so, even in the presence of abnormality occurring in a temperature at the drying part during printing, a printed object reduced in print quality by the abnormality can be subjected to a follow-up process easily.

According to a sixth aspect of the present invention, the printing apparatus according to the fifth further includes an inspection processing part that inspects an image printed by the head part in terms of the print unit. The print quality information contains information about print quality based on result of inspection by the inspection processing part.

A seventh aspect of the present invention is directed to a printing system including: the printing apparatus according to the fifth aspect; and a printer controller section that supplies the printing apparatus with print data. The printer controller section includes: a receiving part that receives the print quality information output from the output part; and a reprinting instruction part that instructs the printing apparatus to reprint a print unit of poor print quality on the basis of the print quality information received by the receiving part.

An eighth aspect of the present invention is directed to a printing system including: the printing apparatus according to the fifth aspect; and a post-processing device that processes a printed object printed by the printing apparatus. The post-processing device includes: a receiving part that receives the print quality information output from the output part; and a post-processing part that performs a predetermined process on a print unit of poor print quality on the basis of the print quality information received by the receiving part.

A ninth aspect of the present invention is directed to a printing method including the steps of: (a) transporting an elongated strip-shaped base material in a transport direction; (b) making a print in terms of a predetermined print unit by causing a head part to eject ink to the base material transported by the step (a); (c) detecting at least one of variation in a temperature at the head part, variation in the transport speed of the base material, variation in tension applied to the base material, and variation in the position of the base material as viewed in a width direction perpendicular to the transport direction; (d) estimating print quality in terms of the print unit printed by the step (b) on the basis of a variation element detected by the step (c); (e) storing print quality information containing the print unit and the print quality estimated by the step (d) in association with each other; and (f) outputting the print quality information.

In the printing method according to the ninth aspect, print quality in terms of a print unit based on a variation element is stored as the print quality information and is output. By doing so, even in the presence of abnormality occurring during printing, a printed object reduced in print quality by the abnormality can be subjected to a follow-up process easily.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows an example of a parameter setting screen;

FIG. 9 shows an example of print quality information.

DESCRIPTION OF THE PREFERRED EMBODIMENTS

Figure 1:
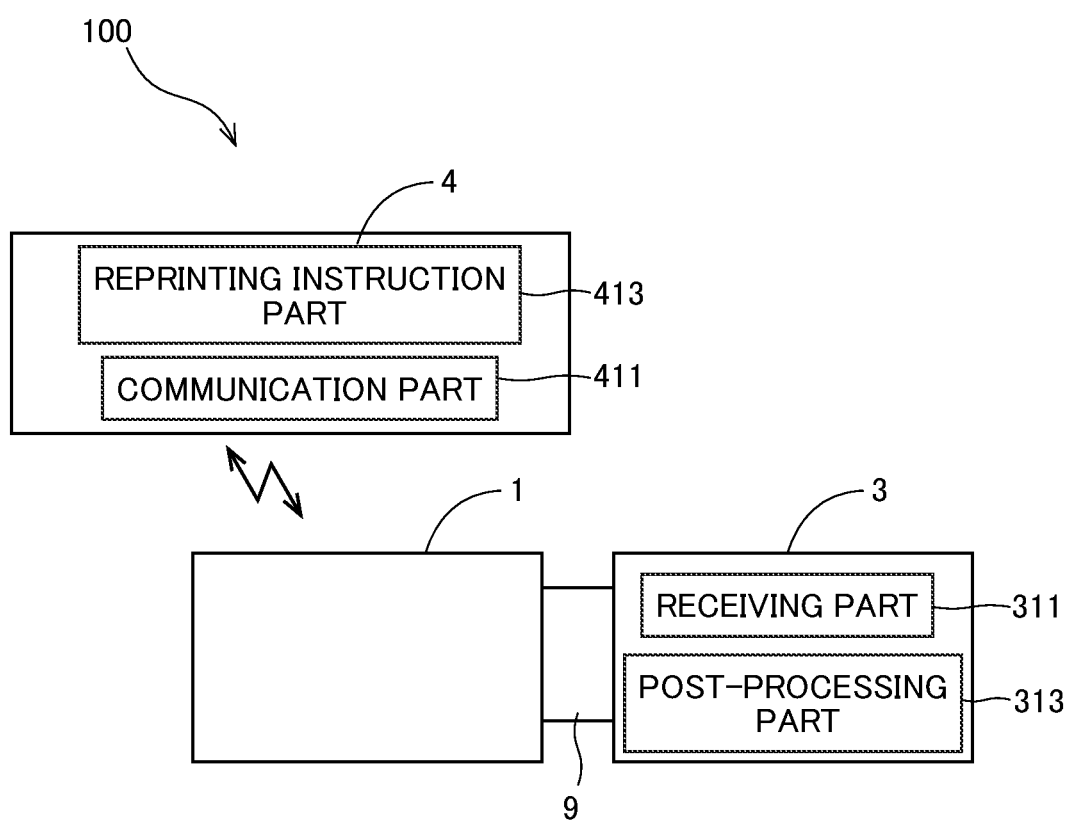
FIG. 1 shows a printing system according to a preferred embodiment.

A preferred embodiment of the present invention will be described below by referring to the accompanying drawings. Constituting elements in the preferred embodiment are described merely as examples, and the scope of the present invention is not intended to be limited only to these elements. To facilitate understanding, the size of each part or the number of such parts in the drawings may be illustrated in an exaggerated or simplified manner, if necessary.

<1. Preferred Embodiment>

FIG. 1 shows a printing system 100 according to the preferred embodiment. The printing system 100 includes a printing apparatus 1, a post-processing device 3, and a printer controller section 4.

The printing apparatus 1 is a continuous feed printing machine that makes a print on elongated strip-shaped continuous paper 9. The post-processing device 3 performs a predetermined post-processing step on the continuous paper 9 ejected from the printing apparatus 1. For example, the post-processing device 3 performs a process of cutting the continuous paper 9 or a process of excluding some of printed objects resulting from the cutting. The post-processing device 3 may be configured to bind a book by stacking the cut printed objects in predetermined order. The post-processing device 3 may also be configured to perform an additional step such as laminating.

The printer controller section 4 is configured as a computer including a processor such as a CPU, a ROM, and a RAM. The printer controller section 4 provides print data to the printing apparatus 1. The print data includes image data indicating an image to be printed by the printing apparatus 1 and information such as a print run. The printing apparatus 1 performs a printing process on the basis of the print data.

Figure 2:
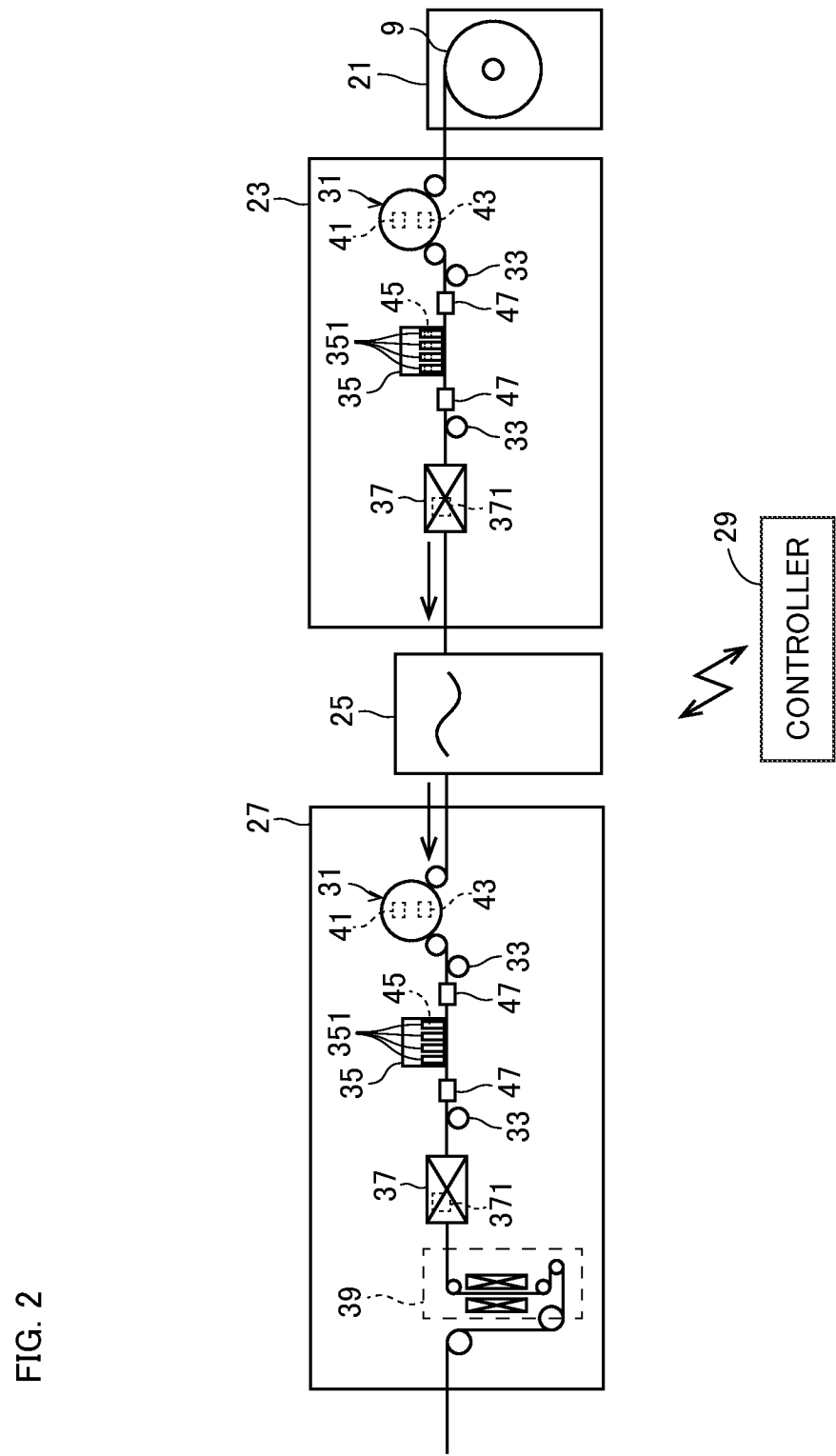
FIG. 2 shows the configuration of a printing apparatus according to the preferred embodiment.

FIG. 2 shows the configuration of the printing apparatus 1 according to the preferred embodiment. The printing apparatus 1 includes a paper feeder 21, a front surface printing unit 23, an inverting unit 25, a back surface printing unit 27, and a controller 29.

The paper feeder 21 supplies the continuous paper 9 to the front surface printing unit 23. The paper feeder 21 holds the continuous paper 9 in a roll shape rotatably about a horizontal axis. The continuous paper 9 is an example of an elongated strip-shaped base material. The base material may alternatively be a plastic film, for example. The paper feeder 21 rotates the continuous paper 9 in a roll shape to feed the continuous paper 9 to the front surface printing unit 23.

The front surface printing unit 23 is to make a print on one of main surfaces (largest surfaces) on both sides of the continuous paper 9 while transporting the continuous paper 9 in a transport direction. The front surface printing unit 23 includes a driving part 31, a plurality of transport rollers 33, a printing part 35, and a drying part 37. In the following description, being downstream in the transport direction will simply be called being "downstream." Being upstream in the transport direction will simply be called being "upstream." The driving part 31 and the transport rollers 33 are examples of a transport part. The number and layout of the transport rollers 33 of FIG. 2 are shown as examples. Specifically, while two transport rollers 33 are shown to be provided in each of the printing units 23 and 27 in FIG. 2, a larger number or a smaller number of the transport rollers 33 may be provided. While the transport roller 33 shown in FIG. 2 is arranged between an edge sensor 47 the drying part 37 described later, this arrangement may be replaced with another arrangement or additional transport roller 33 may be provided. For example, the transport roller 33 may be arranged between the printing part 35 and the edge sensor 47 described later.

The driving part 31 takes the continuous paper 9 into the front surface printing unit 23 from the paper feeder 21. For example, the driving part 31 is composed of a plurality of rollers. The transport rollers 33 are located downstream from the driving part 31. The continuous paper 9 is transported in the transport direction by the driving part 31 while being supported by the transport rollers 33.

The printing part 35 is located downstream from the driving part 31. The printing part 35 includes a plurality of head parts 351. The head parts 351 eject droplets of ink to the main surface of the continuous paper 9. The head parts 351 are aligned at intervals in the transport direction. The head parts 351 may eject ink of respective colors (cyan, magenta, yellow, and black, for example).

The drying part 37 is located downstream from the printing part 35. The drying part 37 dries ink applied to the continuous paper 9 by the printing part 35. The drying part 37 increases a temperature at the continuous paper 9 or around the continuous paper 9 by blowing hot air on the continuous paper 9 or applying radiant heat to the continuous paper 9 given from a heat source such as an electric heater, for example. The drying part 37 may include a heat roller, for example. A temperature at the continuous paper 9 may be increased by causing the heat roller to contact the continuous paper 9.

The drying part 37 includes a drying part temperature sensor 371. The drying part temperature sensor 371 detects a temperature at the drying part 37. The drying part temperature sensor 371 may measure a temperature at the continuous paper 9 on the drying part 37 or a temperature around the continuous paper 9, for example. If the drying part 37 supplies hot air, the drying part temperature sensor 371 may measure the temperature of the hot air. If the drying part 37 includes a heat roller, the drying part temperature sensor 371 may measure a surface temperature at the heat roller. The drying part temperature sensor 371 outputs a detection signal indicating the detected temperature to the controller 29. The drying part temperature sensor 371 is an example of a second detector.

The front surface printing unit 23 further includes an encoder 41, a tension sensor 43, a head part temperature sensor 45, and edge sensors 47. The encoder 41, the tension sensor 43, the head part temperature sensor 45, and the edge sensors 47 are examples of a first detector.

The encoder 41 and the tension sensor 43 are provided at the driving part 31, for example. The encoder 41 detects the amount of rotation of one roller forming the driving part 31, for example. More specifically, each time the roller of the driving part 31 rotates a predetermined angle, the encoder 41 outputs a pulse signal to the controller 29.

The controller 29 detects the amount of movement of the continuous paper 9 on the basis of the pulse signal output from the encoder 41. The controller 29 calculates the transport speed of the continuous paper 9 on the basis of the amount of movement of the continuous paper 9. The controller 29 determines timing of ejection of ink from each head part 351 on the basis of the amount of movement of the continuous paper 9.

The tension sensor 43 detects tension applied to the continuous paper 9. The tension sensor 43 outputs a detection signal indicating the level of the detected tension to the controller 29.

The head part temperature sensor 45 detects a temperature at the head part 351. The head part temperature sensor 45 detects a temperature at one of the head parts 351, for example. The head part temperature sensor 45 may detect temperatures at the respective head parts 351 individually. The head part temperature sensor 45 outputs a detection signal indicating the detected temperature at the head part 351 to the controller 29.

The edge sensors 47 are located upstream and downstream from the printing part 35. The edge sensors 47 detect the position of one of edges of the continuous paper 9 as viewed in a width direction perpendicular to the transport direction. The edge sensors 47 each include a light emitter that emits light to the edge of the continuous paper 9, and a photosensor that detects the light from the light emitter, for example.

The controller 29 measures the amount of movement (the amount of meandering) of the continuous paper 9 as viewed in the width direction on the basis of detection signals output from the edge sensors 47. The front surface printing unit 23 may include a camera for capturing an image of the edge of the continuous paper 9, instead of the edge sensors 47. The controller 29 may identify the position of the edge of the continuous paper 9 to measure the amount of meandering of the continuous paper 9 on the basis of the image captured by the camera.

The inverting unit 25 turns over the continuous paper 9 fed from the front surface printing unit 23. The continuous paper 9 turned over by the inverting unit 25 is carried into the back surface printing unit 27.

The back surface printing unit 27 makes a print on the other main surface of the continuous paper 9 having been turned over by the inverting unit 25. The back surface printing unit 27 has a similar configuration to the front surface printing unit 23. The back surface printing unit 27 includes an image inspection part 39. The image inspection part 39 is located downstream from the drying part 37. The image inspection part 39 includes a camera for capturing images of the main surfaces of the continuous paper 9 on both sides, for example. The image inspection part 39 outputs the images captured by the camera to the controller 29. As described later, the controller 29 inspects a printed image to determine the presence or absence of a defect such as a break or dirt in the printed image on the basis of the images output from the image inspection part 39. The image inspection part 39 may include a spectrophotometric colorimeter for color measurement of the printed image.

Figure 3:
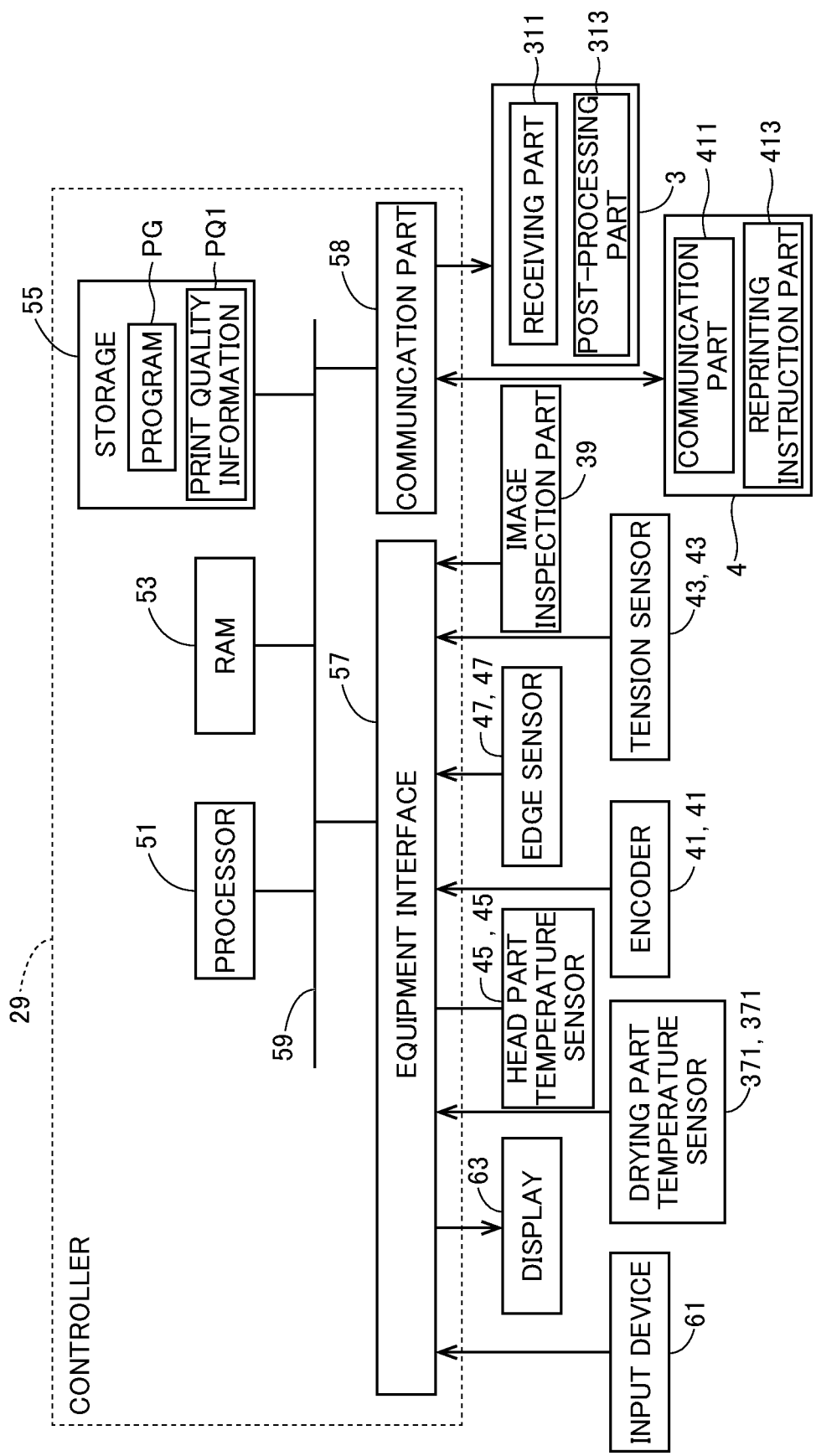
FIG. 3 shows the configuration of a controller.

FIG. 3 shows the configuration of the controller 29. The controller 29 includes a processor 51, a RAM 53, a storage 55, an equipment interface 57, and a communication part 58. The processor 51, the RAM 53, the storage 55, the equipment interface 57, and the communication part 58 are connected to each other through bus wiring 59. The processor 51 is composed of a CPU, for example. The RAM 53 is a device storing various types of information temporarily. The storage 55 is a non-transitory storage medium storing various types of information on a long-term basis. The storage 55 is composed of a ROM or a fixed disk such as a hard disk drive, for example. The storage 55 stores a program PG and print quality information PQ1. The print quality information PQ1 will be described later.

The controller 29 is connected communicably to various types of equipment provided in the printing apparatus 1 through the equipment interface 57. The controller 29 is connected to an input device 61 and a display 63 through the equipment interface 57. The input device 61 is composed of a mouse, a keyboard, etc., for example. The display 63 displays various types of information. The display 63 may be configured as a touch panel to become function as an input device. The controller 29 is connected through the equipment interface 57 to the drying part temperature sensor 371, the image inspection part 39, the encoder 41, the tension sensor 43, the head part temperature sensor 45, and the edge sensors 47.

The communication part 58 is a device used by the printing apparatus 1 for making communication with external equipment. The communication part 58 is communicable with the post-processing device 3 and the printer controller section 4, for example.

Figure 4:
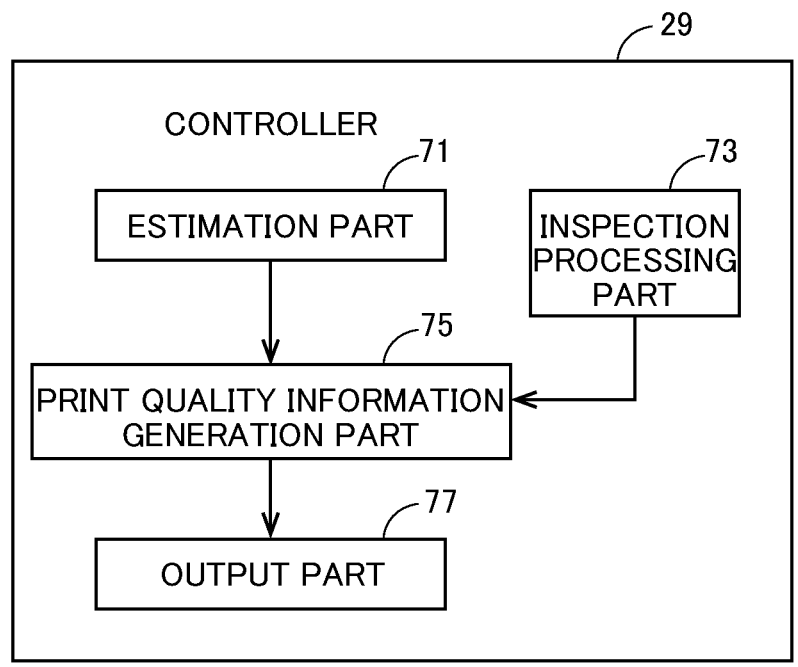
FIG. 4 shows the functional configuration of the controller.

FIG. 4 shows the functional configuration of the controller 29. The controller 29 functions as an estimation part 71, an inspection processing part 73, a print quality information generation part 75, and an output part 77. Each function of the controller 29 is realized by causing the processor 51 to execute the program PG. At least some of the functions of the controller 29 may be realized by a dedicated circuit (an ASIC, for example).

The estimation part 71 estimates print quality in terms of a predetermined print unit generated by printing on the basis of a variation element. More specifically, the variation element includes variation in a temperature at the head part 351 based on output from the head part temperature sensor 45, variation in the transport speed of the continuous paper 9 based on output from the encoder 41, variation in tension based on output from the tension sensor 43, and variation in a meandering amount based on outputs from the edge sensors 47. The variation element further includes variation in a temperature at the drying part 37.

The print unit is freely settable. More specifically, the print unit may be a "page" defined in print data, a "section" composed of a plurality of pages, or a "job" composed of a plurality of sections. Alternatively, the print unit may be a "print region" having a predetermined length in the continuous paper 9 as viewed in the transport direction. While the print unit described below is a "page," the present invention can be carried out in the same way using another print unit.

At least two quality ranks are defined in advance for print quality. In this preferred embodiment, these defined ranks include a rank A (high quality), a rank B (middle quality), and a rank C (low quality). Namely, the estimation part 71 evaluates print quality in terms of a printed page at three stages from the rank A to the rank C.

The inspection processing part 73 inspects a printed image in terms of a page to determine the presence or absence of a defect in the printed image on the basis of an image captured by the camera of the image inspection part 39. If the image inspection part 39 includes a spectrophotometric colorimeter, the inspection processing part 73 may inspect a printed image to determine the presence or absence of a defect in the printed image on the basis of result of color measurement.

The print quality information generation part 75 generates the print quality information PQ1. The print quality information PQ1 is information containing print quality in terms of a printed page estimated by the estimation part 71. Namely, the print quality information PQ1 is information containing a printed page and the print quality of this page in association with each other. The print quality information PQ1 may contain information about print quality based on result of inspection by the inspection processing part 73.

The output part 77 outputs the print quality information PQ1 to the outside of the controller 29. The output part 77 may perform an output process of displaying the print quality information PQ1 on the display 63. The output part 77 may output the print quality information PQ1 to the post-processing device 3 and the printer controller section 4.

FIG. 5 shows an example of a parameter setting screen CS1. The parameter setting screen CS1 is a graphical user interface for setting of various parameters used by the estimation part 71 in estimating print quality. The parameter setting screen CS1 is displayed on the display 63, for example. A user inputs each parameter on the parameter setting screen CS1 by operating the input device 61.

On the parameter setting screen CS1, a threshold is set for several variation elements to determine the print quality as the rank B or rank C. In the example shown in FIG. 5, regarding variation in a meandering amount, for example, "70 µm" is set as a threshold for the rank C and "50 µm" is set as a threshold for the rank B. In this case, the estimation part 71 determines a page printed with a meandering amount of equal to or greater than 70 µm to be in the rank C. The estimation part 71 determines a page printed with a meandering amount of equal to or greater than 50 µm and less than 70 µm to be in the rank B. The estimation part 71 determines a page printed with a meandering amount of less than 50 µm to be in the rank A. Like the variation in a meandering amount, the estimation part 71 determines a quality rank in relation to the other variation elements on the basis of the set thresholds.

The variation elements shown in FIG. 5 include "printing during acceleration/deceleration" meaning that a print was made during increase or decrease in a transport speed. On the parameter setting screen CS1, this variation element "printing during acceleration/deceleration" is set by a quality rank, not by a threshold. In the example shown in FIG. 5, "printing during acceleration/deceleration" is set at "rank B." In this case, the estimation part 71 determines a page printed during acceleration/deceleration to be in the rank B.

The type of the continuous paper 9 is selectable on the parameter setting screen CS1. One type may be selected as the type of the continuous paper 9 from a plurality of options prepared in advance to set each threshold automatically to a value determined in advance. Each threshold may be changed from the automatically determined value on the basis of input from a user.

<Variation in Transport Speed>

Figure 6:
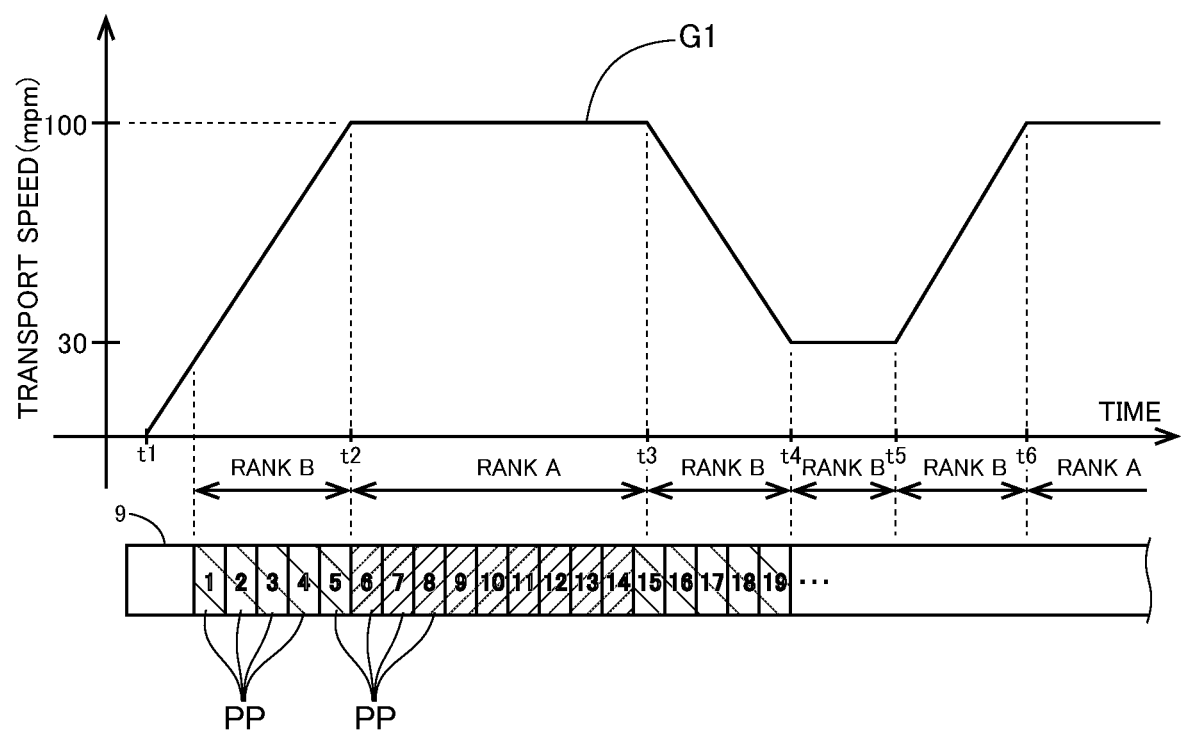
FIG. 6 shows a relationship between variation in a transport speed and a quality rank.

FIG. 6 shows a relationship between variation in a transport speed and a quality rank. In FIG. 6, a vertical axis shows a transport speed and a horizontal axis shows time. A graph G1 shows variation in a transport speed. FIG. 6 conceptually shows the continuous paper 9 and pages printed on the continuous paper 9 (printed pages PP). All the printed pages PP are given respective numbers indicating the order of printing on the continuous paper 9 (this also applies to FIGS. 7 and 8).

In the example shown in FIG. 6, a transport speed is increased from 0 mpm (meters per minute) to 100 mpm in a period from time t1 to time t2, is constantly 100 mpm (maximum speed) in a period from the time t2 to time t3, and is decreased from 100 mpm to 30 mpm in a period from the time t3 to time t4. The transport speed is constantly 30 mpm (low speed) in a period from the time t4 to time t5, is increased from 30 mpm to 100 mpm in a period from the time t5 to time t6, and is 100 mpm after the time t6.

As shown in FIG. 5, in relation to variation in a transport speed, a threshold for the rank B is set at equal to or less than 30 mpm, and print quality during acceleration/deceleration is set at the rank B. Then, in the example shown in FIG. 6, the estimation part 71 determines printed pages PP ($6^{th}$ to $14^{th}$ pages) made in the period from the time t2 to the time t3 in which the transport speed is constantly 100 mpm and determine printed pages PP made after the time t6 to be in the rank A. The estimation part 71 determines printed pages PP made in the period from the time t4 to the time t5 in which the transport speed is 30 mpm to be in the rank B. Also, the estimation part 71 determines printed pages PP made in a period of acceleration or deceleration including printed pages PP ($1^{st}$ to $5^{th}$ pages) made in the period from the time t1 to the time t2, determines printed pages PP ($15^{th}$ to $19^{th}$ pages) made in the period from the time t3 to the time t4, and determines printed pages PP made in the period from the time t5 to the time t6 to be in the rank B.

Increasing or decreasing the transport speed is likely to cause reduction in print quality. For this reason, by storing the quality rank of a printed page PP made during acceleration or deceleration as the rank B as a relatively low rank, this printed page PP is subjected to a follow-up process easily.

<Variation in Meandering Amount>

Figure 7:
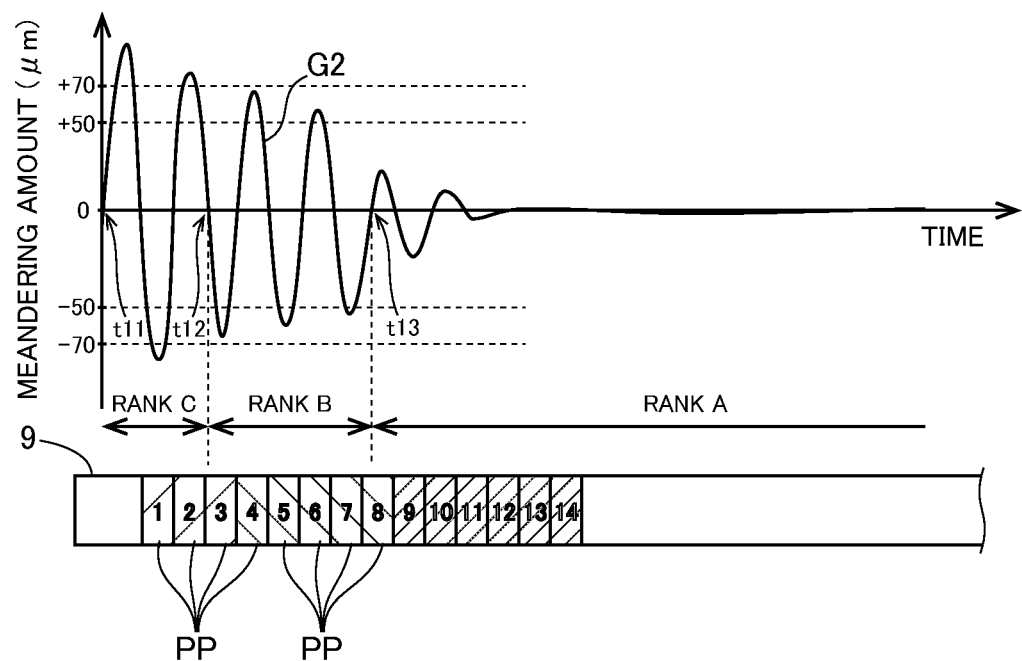
FIG. 7 shows a relationship between variation in a meandering amount and a quality rank.

FIG. 7 shows a relationship between variation in a meandering amount and a quality rank. In FIG. 7, a vertical axis shows a meandering amount and a horizontal axis shows time. A graph G2 shows variation in a meandering amount.

A meandering amount is determined to be zero while an edge of the continuous paper 9 is at a predetermined reference position, and this meandering amount shows the dimension (amplitude) of a variation (fluctuation) of the position of the continuous paper 9 toward one side of the other side of the width direction. In the example shown in FIG. 7, the meandering amount is equal to or greater than 70 μm in a period from time t11 to time t12, equal to or greater than 50 μm and less than 70 μm in a period from the time t12 to time t13, and less than 50 μm after the time t13. Variation in the meandering amount such as that shown in FIG. 7 is likely to occur during increase in the transport speed of the continuous paper 9, for example.

As shown in FIG. 5, in relation to variation in a meandering amount, a threshold for the rank C is set at equal to or greater than 70 μm, and a threshold for the rank B is set at equal to or greater than 50 μm. In this case, the estimation part 71 determines printed pages PP ($1^{st}$ and $2^{nd}$ pages) made in the period from the time t11 to the time t12 to be in the rank C, determines printed pages PP ($3^{rd}$ to $7^{th}$ pages) made in the period from the time t12 to the time t13 to be in the rank B, and determines printed pages PP (pages from an $8^{th}$ page) made in the period after the time t13 be in the rank A.

<Variation in Temperature at Head Part>

Figure 8:
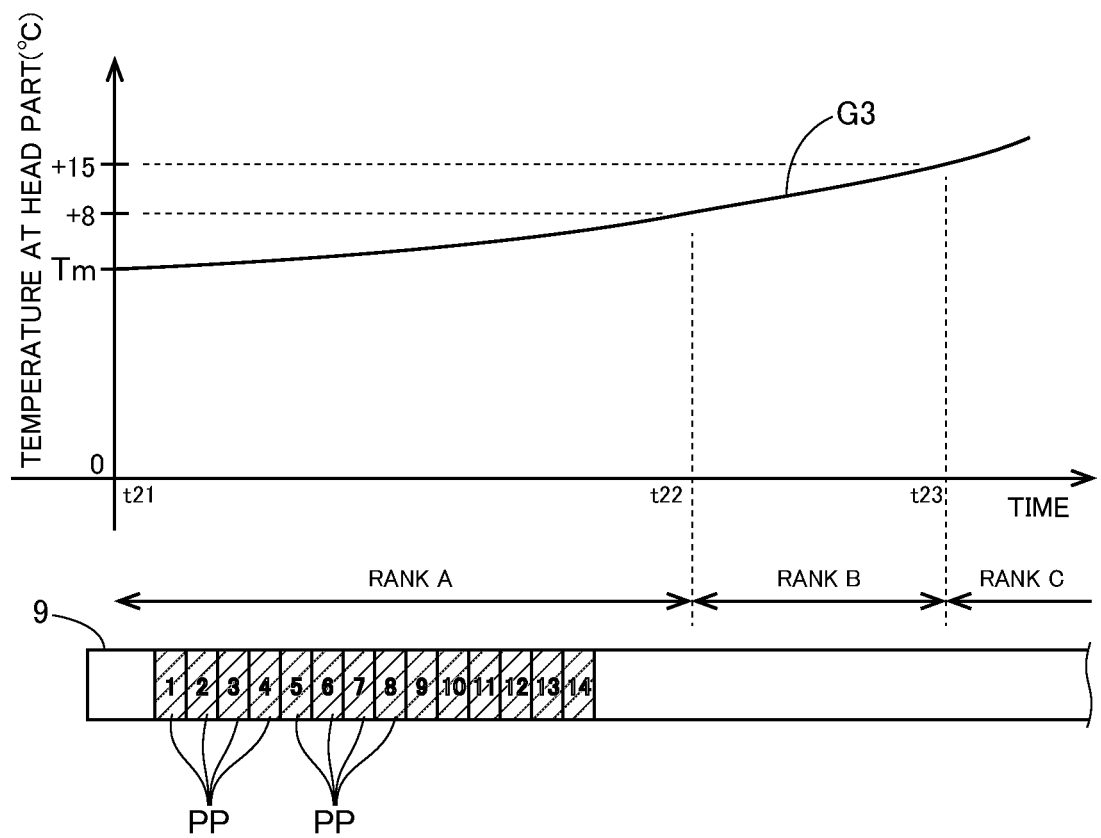
FIG. 8 shows a relationship between variation in a temperature at a head part and a quality rank.

FIG. 8 shows a relationship between variation in a temperature at the head part 351 and a quality rank. In FIG. 8, a vertical axis shows a temperature at the head part 351 and a horizontal axis shows time. A graph G3 shows variation in a temperature at the head part 351. As shown in FIG. 8, a temperature at the head part 351 may be increased gradually by performing printing continuously.

As shown in FIG. 5, thresholds are set in such a manner that a temperature at the head part 351 higher than a reference temperature Tm by 15° C. or more is determined to be in the rank C, and a temperature at the head part 351 higher than the reference temperature Tm by degrees of equal to or greater than 8° C. and less than 15° C. is determined to be in the rank B. Then, in the example shown in FIG. 8 in which variation in the temperature in a period from time t21 to time t22 is less than 8° C., the estimation part 71 determines printed pages PP made in the period from the time t21 to the time t22 to be in the rank A. As variation in the temperature in a period from the time t22 to time t23 is equal to or greater than 8° C. and less than 15° C., the estimation part 71 determines printed pages PP made in the period from the time t22 to the time t23 to be in the rank B. Also, as variation in the temperature at the head part 351 in a period after the time t23 is equal to or greater than 15° C., the estimation part 71 determines printed pages PP made in the period after the time t23 to be in the rank C.

FIG. 9 shows an example of the print quality information PQ1. The print quality information PQ1 contains a quality rank estimated by the estimation part 71 in terms of a printed page and in terms of a variation element. The print quality information PQ1 contains result of inspection (image inspection) conducted by the inspection processing part 73. In the example shown in FIG. 9, the inspection processing part 73 determines a page without a defect to be in the rank A (high quality) and determines a page with a defect to be in the rank C (low quality). The print quality information generation part 75 adds comprehensive judgment information to the print quality information PQ1 in terms of a page. In the example shown in FIG. 9, the comprehensive judgment information is the lowest quality rank among quality ranks in relation to variation elements and a quality rank given by the inspection processing part 73. Thus, if the quality ranks relating to the variation elements include even a single quality rank that is the lowest rank C, the comprehensive judgment information is determined to be the rank C. The comprehensive judgment information may be determined to be the rank C if the number of quality ranks determined to be the rank B is equal to or greater than a predetermined number, for example.

The output part 77 displays the print quality information PQ1 shown in FIG. 9 on the display 63. By doing so, a user becomes capable of easily identifying a page with a trouble in print quality. The output part 77 may extract some part from the entire print quality information PQ1 such as a page with poor print quality (with the comprehensive judgment information determined to be the rank C, for example), and display the extracted part in a highlighted manner on the display 63.

As shown in FIG. 1 or 3, the post-processing device 3 includes a receiving part 311 and a post-processing part 313. The receiving part 311 receives the print quality information PQ1 output from the output part 77. The post-processing part 313 cuts the continuous paper 9 into printed pages, for example. The post-processing part 313 may exclude an unnecessary printed object by removing this object from printed objects resulting from the cutting. The post-processing part 313 may remove pages with poor print quality (e.g., the comprehensive judgment information determined to be the rank C) on the basis of the print quality information PQ1. The post-processing device 3 may include a unit (a taper inserter, for example) for affixing tape to a page with poor print quality on the basis of the print quality information PQ1.

As shown in FIG. 1 or 3, the printer controller section 4 includes a communication part 411 and a reprinting instruction part 413. The communication part 411 transmits print data to the printing apparatus 1. The communication part 411 receives the print quality information PQ1 output from the output part 77. The communication part 411 is an example of a receiving part. The reprinting instruction part 413 instructs the printing apparatus 1 to perform reprinting on the basis of the print quality information PQ1. More specifically, on the basis of the print quality information PQ1, print data about a page with poor print quality (with the comprehensive judgment information determined to be the rank C, for example) is transmitted to the printing apparatus 1. In response to this, the printing apparatus 1 reprints the page with the poor print quality on the basis of the print data. In this way, it becomes possible to reprint a page with poor print quality automatically.

The output part 77 may cause the printing part 35 of the back surface printing unit 27 to print the print quality information PQ1 about a page printed by the front surface printing unit 23. For example, if a page printed by the front surface printing unit 23 has poor print quality (with the comprehensive judgment information determined to be the rank C, for example), the printing part 35 of the back surface printing unit 27 may print a predetermined mark indicating disapproval such as a cross on the back side of this page. The post-processing device 3 may be configured to recognize the mark indicating disapproval to exclude a printed object with the printed mark.

<2. Modification>

While the preferred embodiment has been described hereinabove, the present invention is not limited to the foregoing preferred embodiment but is changeable in various ways.

For example, the inverting unit 25 and the back surface printing unit 27 are not essential structures and are omissible. If the back surface printing unit 27 is omitted, the image inspection part 39 may be provided at the front surface printing unit 23.

While the invention has been shown and described in detail, the foregoing description is in all aspects illustrative and not restrictive. It is therefore understood that numerous modifications and variations can be devised without departing from the scope of the invention. The structures described in the foregoing preferred embodiment and in the modifications may be combined together without inconsistencies, if appropriate, or may be omitted.

What is claimed is:

1. A printing apparatus for detecting print quality based upon a detected variation, the printing apparatus comprising:
 a transport part that transports an elongated strip-shaped base material in a transport direction;
 a head part that makes a print on predetermined print units set on said base material by ejecting ink to said base material transported by said transport part;
 a first detector that detects at least one of a plurality of variations related to said base material while said base material is being printed upon by said head part, said plurality of variations containing a variation in a temperature at said head part, a variation in a transport speed of said base material transported by said transport part, a variation in tension applied to said base material transported by said transport part, and a variation in a position of said base material transported by said transport part as viewed in a width direction perpendicular to said transport direction;
 a processor; and
 a storage;
 wherein said processor is programmed to perform:
 an estimation process to estimate print quality on each of said print units on the basis of at least one of said plurality of the variations detected by said first detector;
 a storage process to store print quality information containing a respective print unit and print quality of the respective print unit estimated by said estimation process in association with each other in said storage; and
 an output process to output said print quality information.

2. The printing apparatus according to claim 1,
 wherein said processor performs an inspection process to inspect an image printed by said head part on each of said print units, and
 wherein said print quality information contains information about print quality based on results of inspection by said inspection process.

3. A printing system for detecting print quality based upon a detected variation, the printing system comprising:
 the printing apparatus according to claim 1; and
 a printer controller section that supplies said printing apparatus with print data, wherein said printer controller section comprises:
 a reprinting instruction part that instructs said printing apparatus to reprint a print unit of poor print quality on the basis of said print quality information output by said printing apparatus through said output process.

4. A printing system comprising:
 the printing apparatus according to claim 1; and
 a post-processing device that processes a printed object printed by said printing apparatus, wherein
 said post-processing device comprises:
 a post-processing part that performs a predetermined process on a print unit of poor print quality on the basis of said print quality information output by said printing apparatus through said output process.

5. A printing apparatus for detecting print quality based upon a detected variation, the printing apparatus comprising:
 a transport part that transports an elongated strip-shaped base material in a transport direction;
 a head part that makes a print on predetermined print units set on said base material by ejecting ink to said base material transported by said transport part;
 a drying part that dries ink adhering to said base material transported by said transport part at a position downstream from said head part in said transport direction;
 a first detector that detects variation in a temperature at said drying part;
 a processor; and
 a storage;
 wherein said processor is programmed to perform:

an estimation process to estimate print quality on each of said print units on the basis of the variation in temperature detected by said first detector while the drying part is drying ink adhering to said base material being transported by said transport part;

a storage process to store print quality information containing a respective print unit and print quality of the respectively print unit estimated by said estimation process in association with each other in said storage; and an output process to output said print quality information.

6. The printing apparatus according to claim 5, wherein said processor performing an inspection process to inspect an image printed by said head part on each of said print units, and wherein said print quality information contains information about print quality based on results of inspection by said inspection process.

7. A printing system for detecting print quality based upon a detected variation, the printing system comprising:

the printing apparatus according to claim 5; and a printer controller section that supplies said printing apparatus with print data, wherein said printer controller section comprises:

a reprinting instruction part that instructs said printing apparatus to reprint a print unit of poor print quality on the basis of said print quality information output by said printing apparatus through said output process.

8. A printing system for detecting print quality based upon a detected variation, the printing system comprising:

the printing apparatus according to claim 5; and a post-processing device that processes a printed object printed by said printing apparatus, wherein said post-processing device comprises:

a post-processing part that performs a predetermined process on a print unit of poor print quality on the basis of said print quality information output by said printing apparatus through said output process.

9. A printing method comprising the steps of:

(a) transporting an elongated strip-shaped base material in a transport direction;

(b) making a print on predetermined print units set on said base material by causing a head part to eject ink to said base material transported by said step (a);

(c) detecting at least one of a plurality of variations related to said base material while the said base material is being printed upon by said head part, said plurality of variations containing a variation in a temperature at said head part, a variation in a transport speed of said base material transported by said step (a), a variation in tension applied to said base material transported by said step (a), and a variation in a position of said base material transported by said step (a) as viewed in a width direction perpendicular to said transport direction;

(d) estimating print quality on each of said print units on the basis of at least one of said plurality of variations detected by said step (c);

(e) storing print quality information containing a respective print unit and print quality of the respective print unit estimated by said step (d) in association with each other; and (f) outputting said print quality information.

10. The printing apparatus according to claim 1, wherein said estimation process includes a process to identify a print unit printed with variation amount of at least one of said plurality of variations detected by said first detector outside a predetermined threshold range and estimate the quality of said print unit to be low quality.

11. The printing apparatus according to claim 1, wherein the first detector detects at least one of said plurality of variations related to said base material while the said base material is being printed upon by said head part, said plurality of variations containing the variation in temperature at said head part, the variation in transport speed of said base material transported by said transport part, and the variation in tension applied to said base material transported by said transport part as viewed in a width direction perpendicular to said transport direction.

12. A printing method according to claim 9, wherein the printing method comprising the step of (c) detecting at least one of said plurality of variations related to said base material while the said base material is being printed upon by said head part, said plurality of variations containing the variation in temperature at said head part, the variation in transport speed of said base material transported by said step (a), and the variation in tension applied to said base material transported by said step (a) as viewed in a width direction perpendicular to said transport direction.

* * * * *